Figure 1:
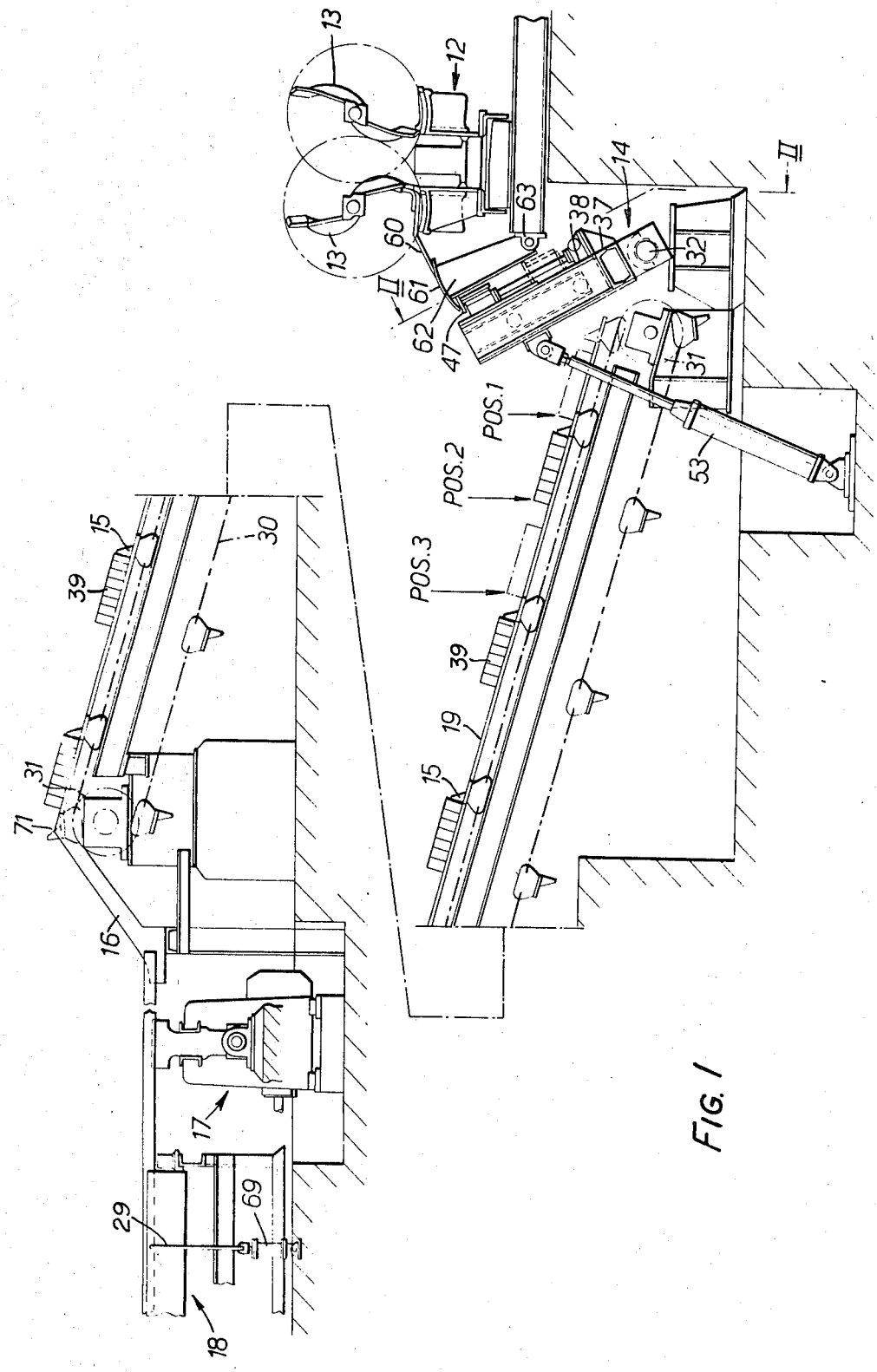

United States Patent

[72] Inventor Derek Stubbins
Sheffield, England
[21] Appl. No. 669,878
[22] Filed Sept. 22, 1967
[45] Patented Dec. 8, 1970
[73] Assignee Davy and United Engineering Company Limited
Sheffield, England
[32] Priority Sept. 23, 1966
[33] Great Britain
[31] No. 42537/66

[54] CONVEYING SYSTEM
4 Claims, 8 Drawing Figs.
[52] U.S. Cl. .................................................. 198/31,
198/30
[51] Int. Cl. ................................................... B65g 47/26
[50] Field of Search ........................................ 198/137,
31, 30; 214/1, (P2); 193/35, 36, 37

[11] 3,545,590

[56] References Cited
UNITED STATES PATENTS
2,234,162  3/1941  Anderson ..................... 193/35(B)
2,763,236  9/1956  Cummings ................... 214/1(P2)
3,180,471  4/1965  Schneider .................... 193/35
*Primary Examiner*—Richard E. Aegerter
*Attorney*—Henry C. Westin ABSTRACT: A conveyor system for 35(B)UX strips comprises a movable conveyor having means at its receiving area for feeding the strips which are arranged parallel to the conveyor length individually onto the conveyor in a direction transverse to the conveyor length and at least one retractable stop which separates the receiving area of the conveyor lengthwise into two sections and the stop serves to control the feed of strips to one or other of the two sections.

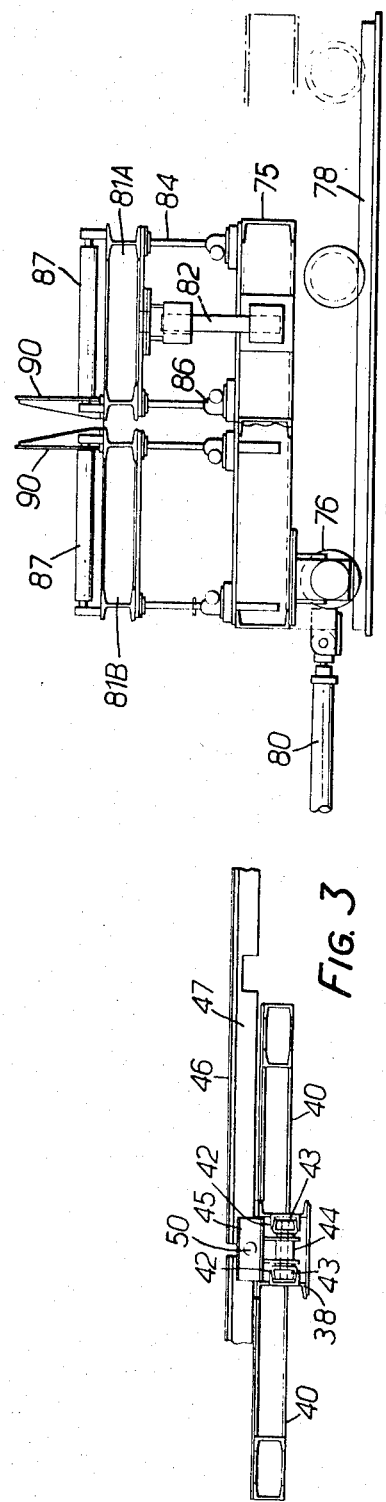
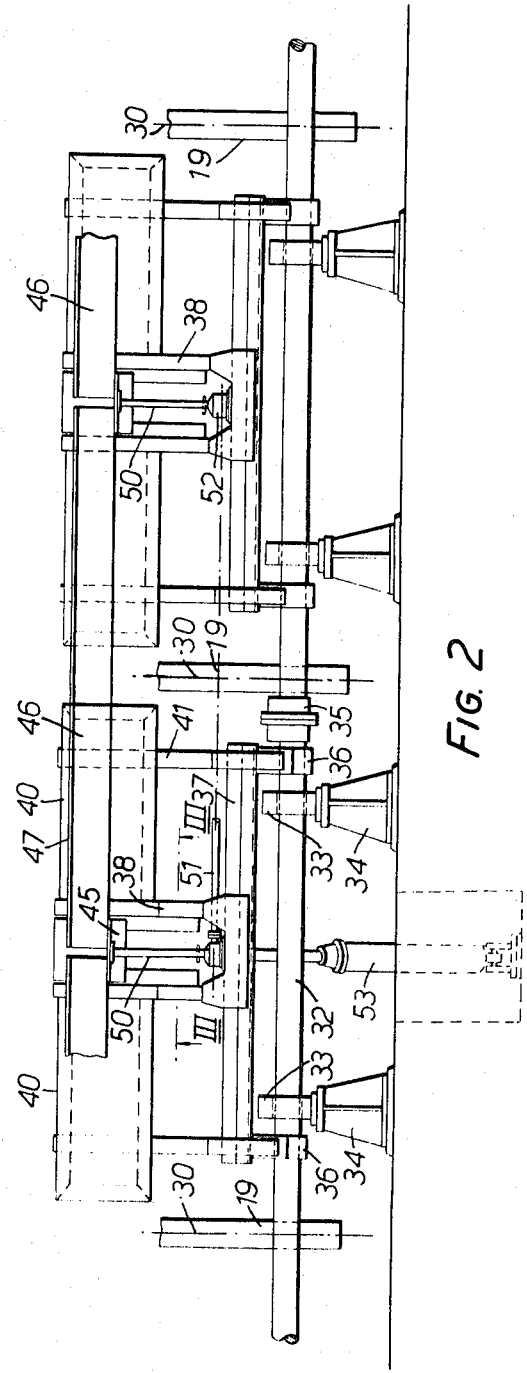

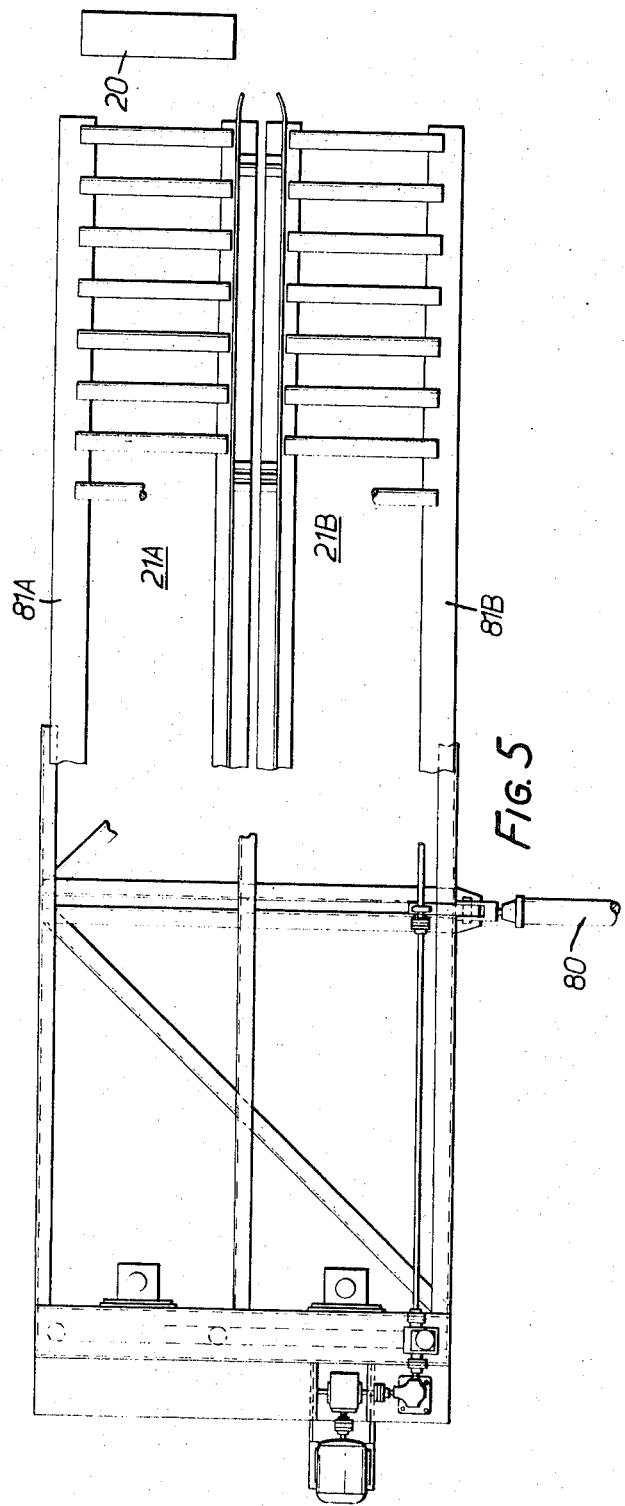

CONVEYING SYSTEM

This invention relates to conveying systems and particularly to a conveyor system for conveying thin strips towards a stacking location. The invention is applicable to the conveyance of strips that have been pack annealed in the apparatus of our copending British Pat. application No. 42536/66 of even date.

A conveyor system for thin strips according to the present invention comprises a movable conveyor, means at a receiving area of the conveyor for feeding strips arranged parallel to the conveyor length individually onto the conveyor in a direction transverse to the conveyor length and at least one retractible stop separating the receiving area of the conveyor lengthwise into two sections, with the or each stop serving to control the feed of strips to one or other of the sections.

There is preferably a single cross-shear located downstream of the movable conveyor, arranged to shear strips from the two sections, simultaneously. Whether or not such a shear is provided, there may be a stacking table to receive strips from the two sections of the movable conveyor and to form two separate stacks of strips. This stacking table may have rollers, onto which the first strips are fed, in order to permit access between the stacks, for the attachment of chains or the like enabling removal of the stacks. Preferably the rollers are idler rollers, the strips being driven over the rollers by means external of the stacking table.

Preferably, the stacking table is formed in two sections, each adapted to receive strips from both sections of the movable conveyor and the stacking table is movable transversely to the direction of flow of the strips, whereby one section may be unloaded, while strips are being fed to the other section.

By separating the strips on the movable conveyor into two separate gangs, the formation of two separate stacks on the stacking table is ensured. This has the advantage, over the formation of a single stack, that a crane of lower capacity may be employed for removal of the strips from the stacking table. In addition, it is possible to employ a single shear operating simultaneously on the strips from both sections of the movable conveyor.

Figure 4:
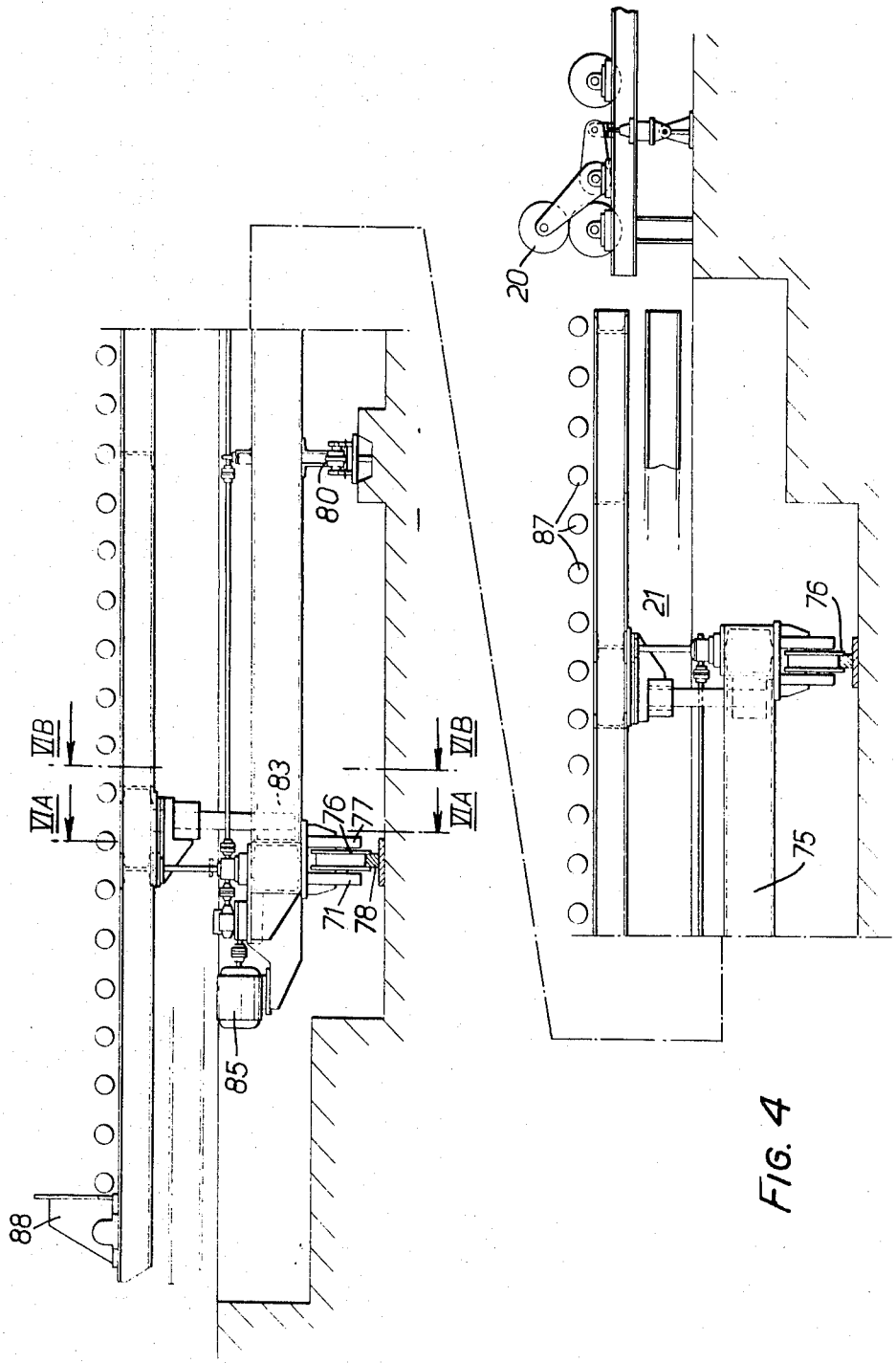
Figure 7:
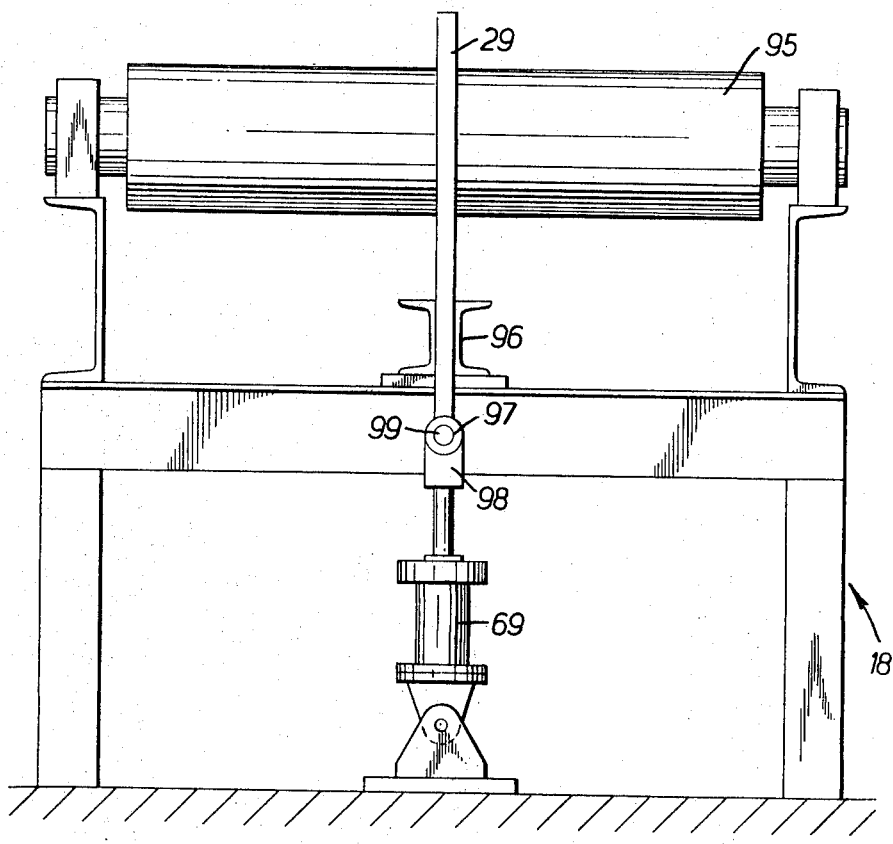
Figure 8:
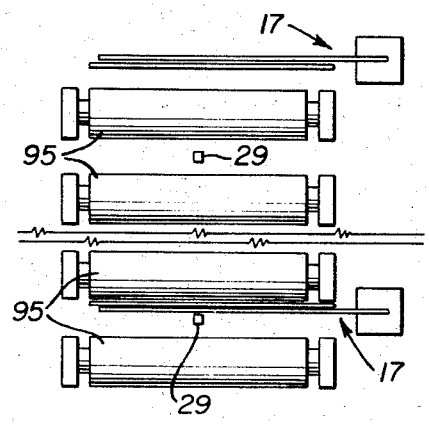

The invention will be more readily understood by way of example from the following description of a conveyor line for cooling and stacking metallic strips in discrete lengths, reference being made to the accompanying drawings, in which FIG. 1 is a side view of stacking apparatus and a cooling conveyor, FIG. 2 is a section on the line II–II of FIG. 1, FIG. 3 is a section on the line III–III of FIG. 2, FIG. 4 is a side view of a stacking table, FIG. 5 is a plan view of the same table, and FIG. 6 is a sectional view, the left-hand and right-hand halves of the FIG. being sections on the lines VIA–VIA and VIB–VIB, respectively, of FIG. 4 and to the accompanying drawing referred to as FIG. 7 which is a section through a retractible stop, FIG. 8 is a partial plan view of the conveyor illustrated in FIGS. 1 and 7.

The apparatus specifically illustrated in the drawings is intended to anneal and stack flats of spring steel coming off a rolling mill at high temperature. It will, however, be appreciated that the apparatus is applicable to other materials. Generally, the flats are conveyed from the rolling mill by a roller table indicated at 12 in FIG. 1 and are swept off table 12 by arms 13 onto a pivoted support device shown generally at 14, in order to form a pack of the flats. When such a pack has been formed, the device 14 is pivoted downwardly so that the pack is picked up by the dogs 15 of a chain conveyor deposited on to slide plates 19, and moved upwardly by the plates 19 and dogs 15. The packs are carried in cyclic movements until at the end of the conveyor the flats of the pack are caused to slide individually down a slideway 16 to a shuffle bar system indicated generally at 17, which feeds a roller table 18.

The roller table 18 (FIGS. 1, 7 and 8) is provided at a receiving area with at least one central disappearing stop 29 which divides the receiving area lengthwise into two equal sections. Central division plates (not shown) divide the roller table 18 other than at the receiving area into two parallel sections aligned with those at the receiving area. The gangs of flats, are formed by operation of the disappearing stops on the roller table 18, which conveys the flats to a cross-shear (not shown), which shears flats in the two sections simultaneously. The sheared flats are passed through driven pinch rolls 20 (FIG. 4) and thence to a stocking table 21. This stacking table is formed in two sections 21A, 21B, each capable of taking the two gangs of flats side-by-side. Each section 21 of the stacking table can be lowered after the arrival of each set of flats, so that stacks of flats are formed on the section. When one section has received its full quota of flats, the stacking table 21 is moved bodily transversely of the pinch rolls in order to present the other, previously unused, section 21. Thus, the two sections of the stacking table are used alternately, the stacks formed on one section being discharged, while stacks are being formed on the other section.

Referring now specifically to the cooling conveyor shown in FIGS. 1–3, this conveyor consists of seven parallel continuous chains 30, of which three are shown in FIG. 2. Each of these chains carries at intervals along its length, a series of the dogs 15, the dogs on the various chains being aligned. The chains pass over driven sprocket wheels 31; as indicated in FIG. 1, the path of the chains is inclined to the horizontal, the packs of flats indicated at 39 being conveyed upwardly from the lowest point of the carry plates 19 onto which the packs are deposited, to the highest point of the plates 19, where the flats are individually discharged onto the slideway 16.

The support device 14 is formed in six sections, each section lying between an adjacent pair of the conveyor chains 30. The various sections are similar, two being shown in FIG. 2 and, for this reason, only one such section will be described. This section is carried on a shaft 32, which itself is supported in bearings 33 secured on pedestals 34; the shafts 32 of the various sections are connected together by joints 35. Secured to the shaft 32 are a pair of arms 36 which carry a crossbeam 37, to which is centrally secured a box section arm 38, carrying in turn transverse members 40, which are additionally supported from the beam 37 by fingers 41.

The central arm 38 carries a pair of lengthwise rails 42, in which run wheels 43 carried on a shaft 44, to which is secured a block 45. A support member 46 is secured between the blocks 45 of adjacent sections of the device 14, this member 46 having a support plate 47 at right angles to the length of the arm 38. The support members 46 can be driven along the length of the arm 38 by screw jacks 50, which are attached to the blocks 45 and which are driven by a shaft 51, through the screw jacks gear boxes 52.

The arms 38 can be rotated about the axis of the shafts 32 by hydraulic rams 53, which are pivoted at their upper ends to the underface of the arms, as shown in FIG. 1.

The flats, which are swept off the roller table 12 by the arms 13, are guided by a fixed guide plate 60 and by an adjustable guide plate 61, the latter being carried on arms 62 which are pivoted on pivot shaft 63.

For the formation of a pack of flats, the device 14 is placed into the position indicated in FIG. 1 and the guide plate 61 is adjusted so that the gap formed between the lower extremity of the plate and the arms 38 is only slightly greater than the width of the hot flats to be delivered. Delivery of the flats is then commenced, the individual flats sliding down the guide plates 60, 61 and the first flat coming to rest with its surface contiguous with the support plates 47 of the members 46 which are initially at their upper extremities, adjacent the plate 61. After the arrival of each flat, the shaft 51 is driven to lower the support plates 47 by the thickness of a flat, so that each successive flat slides down the face of the preceding flat and, with time, forms a pack. When this pack has been thus formed, the hydraulic rams 53 are operated to turn the arms 38 about the shafts 32 in an anticlockwise to the chains 30 of the cooling conveyor. The carry plates 19 are attached to chain segments 30. The device 14 is lowered until only a small clearance is left between the packs and the plates 19. The pack is removed from the device by dogs 15 by the movement of the conveyor sliding the pack from the arms 14 onto the carrying plates 19. When the pack 39 has reached the "POSITION 2" shown in FIG. 1, the rams 53 are actuated to return the device 14 to the receiving position shown in FIG. 1, so that the formation of the next pack can be commenced.

As shown in FIG. 1, the slide 16 has an apex 71 lying over the upper sprocket wheel 31. As the flats are to be allowed to cool in a controlled manner, during their ascent of the conveyor, in order that they may be pack annealed, the cooling conveyor is intermittently operated with the result that each pack 39 takes a substantial time to traverse the length of the conveyor. Thus, each pack, on being deposited in "POSITION 1" is moved to "POSITION 2" in 5 seconds. The conveyor then is topped for 6 minutes, after which it is moved to "POSITION 3" at a creep speed of 2 feet in 2 minutes. In "POSITION 3" there is another delay of 55 seconds, during which the next pack is deposited in "POSITION 1;" the 9 minute cycle is then repeated, each pack remaining on the conveyor for a minimum time of 42 minutes in this particular example. During the part of the cycle at which the conveyor is moving at creep speed, the uppermost pack on the conveyor is slowly moved over the apex 71, so that the flats constituting that pack slide individually down the slideway 16 onto the shuffle bar system 17.

The direction of movement along the roller table 18 is normal to the shuffle bar system 17 and, as before mentioned, the disappearing stops 29, of which one only is shown in FIG. 1, are located between the rollers of the roller table 18 at the receiving area, opposite the shuffle bar system 17, so that, when the stops 29 are raised by the hydraulic cylinders 69, it causes flats to be deposited on the right-hand half of the roller table as viewed in FIG. 1 whereas, when the stops are lowered, the flat is moved to the left-hand half. With the roller table stationary and the stops 29 lowered, the operator allows flats to be moved by the shuffle bar system to fill the left-hand half; thus if each section of the roller table is 18 inches wide, 4 inch-flats are directed to the left-hand half. When the stops 29 are raised the right-hand half is similarly filled with flats. The roller table drive is started to carry the two separate gangs of flats, so formed, simultaneously to shear, the separation of the gangs being maintained by the division plates. All the flats in both gangs are simultaneously sheared by the shears which extend across the full width of the table.

Turning now to FIGS. 4 to 6 and a detailed consideration of the stacking table there shown, the table 21 has a chassis 75 mounted on grooved wheels 76, which are carried in trunnions 77 and which run on rails 78. The stacking table can be driven along the rails 78, through a distance equal to half the width of the table, by a double-acting hydraulic ram 80 coupled to the chassis 75. Mounted side-by-side on the chassis 75 are two platforms 8A and 8B for the two sections 21A, 21B of the roller table. Each of the platforms 8 is vertically movable on the chassis 75, being guided vertically by a pair of pins 82 slidably arranged in blocks 83 on the chassis. Vertical movement of each platform 81 is effected by four screw jacks 84 arranged at the corners of the platform and driven in common by an electric motor 85 carried by the chassis 75; there is a separate motor 85 and drive for each of the two platforms 81.

Each platform 81 carries a set of undriven rollers 87, which constitute the section of the roller table. In addition, each platform 81 carries, at the end distant from the pinch rolls 20, a stop 88, which is adjustable lengthwise of the table. Spacer plates 90 project upwardly from the platforms 81 to ensure that flats directed onto one section of the table do not find their way onto the other section.

Although not shown in FIGS. 4 to 6, each section 21 of the stacking table may have two lifting frames set into the table and arranged to form apron plates between the idler rollers 87. The lifting frames enable the stacks of flats to be removed, without slinging of the stacks themselves.

The operation of the stacking table will be readily apparent from the previous description. The two separated gangs of flats from the shear are driven onto one section 21 of the table by the pinch rolls 20, the flats moving over the idler rollers 87 until brought to rest by the appropriate stop 88. Each time a set of flats is delivered, the appropriate motor 85 is operated to lower the section of the table by the thickness of the flats. In this way, two stacks of flats are formed on the section 21 in use; when the stacks have reached the correct height, further delivery of flats is temporarily ceased and the hydraulic ram 80 is operated to bring the other section of the table into alignment with the pinch rolls 20; delivery of the flats to the new section is then commenced. While the new stacks are forming, using the lifting frames, if provided, and otherwise by passing cables round the individual stacks and lifting with a crane. The two sections of the stacking table are thus used alternately, the completed stacks being removed from one, while stacks are being formed on the other.

Referring to the accompanying drawing, the retractible or disappearing stop 29 is in the form of a plate the length of which extends parallel to the length of the roller table 18 and is located between a pair of rollers one of which is indicated by reference numeral 95. The plate is located in a slotted guide member 96 supported on the framework of the table and the lower end of the plate is shaped to provide a cylindrical bearing surface 97. A coupling bar 98 is pivotally secured at one end to the plate by means of a pin 99 supported in the bearing surface 97 and is connected at its opposite end to the piston rod of a hydraulic cylinder 69. The lower end of the hydraulic cylinder is pivotally secured to a rigid foundation. The plate is raised above or lowered below the upper supporting surface of the rollers by applying fluid under pressure to the appropriate side of the piston in the hydraulic cylinder.

The formation of two gangs of flats by the disappearing stop mentioned above, and thus the two separate stacks of flats on each section of the stacking table, permits the easy removal of the stacks using a crane of smaller capacity than would be needed if a single gang and single stack were formed. In accordance with the provisions of the patent statutes, I have explained the principle and operation of my invention and have illustrated and described what I consider to represent the best embodiment thereof.

I claim:

1. A conveyor system for elongate strips of metal comprising a conveyor having a receiving area at which the strips are loaded onto the conveyor, retractable stop means movable into and out of a blocking position constructed and arranged to divide the receiving area of the conveyor into first and second sections extending lengthwise of the conveyor and said conveyor having supporting elements arranged to convey the strips in a direction perpendicular to the direction the strips are received by said conveyor and means at the receiving area and at one side thereof for feeding strips arranged parallel to the conveyor length individually in a direction transverse to the conveyor length onto the section of the conveyor away from the feeding means when the stop is not in its blocking position and onto the section of the conveyor adjacent the feeding means when the stop is in its blocking position, said feeding means including shuffle bars which are arranged to extend from said one side into said first and second stations.

2. A conveyor system as claimed in claim 1 in which the movable conveyor other than at the receiving area is separated lengthwise into two sections aligned with those at the receiving area by at least one nonretractible division plate.

3. A conveyor system as claimed in claim 1 in which the movable conveyor is a roller table.

4. A conveyor system as claimed in claim 1 in which each stop means is retractible below the level of the supporting surface of the conveyor by hydraulically operable means.

UNITED STATES PATENT OFFICE
CERTIFICATE OF CORRECTION

Patent No. 3,545,590          Dated December 8, 1970

Inventor(s) Derek Stubbins

It is certified that error appears in the above-identified patent and that said Letters Patent are hereby corrected as shown below:

In the Abstract, line 1, "A conveyor system for 35(B)UX st com-" should read -- A conveyor system for thin strips com- -- Column 1, line 56, "FIG. 88" should read -- FIG. 8 --. Column line 73, after "anticlockwise" insert -- direction as seen in Figure 1 until those arms lie parallel --. Column 3, line 16, "topped" should read -- stopped --; line 38, before "4" insert -- four --.

Signed and sealed this 1st day of June 1971.

(SEAL)
Attest:

EDWARD M. FLETCHER, JR.　　　　　　　　WILLIAM E. SCHUYLER, J
Attesting Officer　　　　　　　　　　　　Commissioner of Patent